United States Patent
Nazarov et al.

(10) Patent No.: US 12,526,214 B1
(45) Date of Patent: Jan. 13, 2026

(54) DYNAMIC METRIC DETERMINATION BY A MODEL

(71) Applicant: Amazon Technologies, Inc., Seattle, WA (US)

(72) Inventors: Alexander A Nazarov, Redmond, WA (US); Min Xia, Issaquah, WA (US); Mengyi Zhou, Burnaby (CA)

(73) Assignee: Amazon Technologies, Inc., Seattle, WA (US)

( * ) Notice: Subject to any disclaimer, the term of this patent is extended or adjusted under 35 U.S.C. 154(b) by 93 days.

(21) Appl. No.: 18/542,553

(22) Filed: Dec. 15, 2023

(51) Int. Cl.
*H04L 43/067* (2022.01)
*H04L 43/16* (2022.01)

(52) U.S. Cl.
CPC ............ *H04L 43/067* (2013.01); *H04L 43/16* (2013.01)

(58) Field of Classification Search
CPC .............................. H04L 43/067; H04L 43/16
See application file for complete search history.

(56) References Cited

U.S. PATENT DOCUMENTS

| | | | |
|---|---|---|---|
| 2018/0157983 A1* | 6/2018 | Guruswamappa | G06F 11/3466 |
| 2019/0095311 A1* | 3/2019 | Milirud | G06F 11/3466 |
| 2024/0143666 A1* | 5/2024 | Grushka | G06F 16/907 |
| 2024/0205127 A1* | 6/2024 | Agarwal | G06F 11/3093 |

* cited by examiner

*Primary Examiner* — Kamal M Hossain
(74) *Attorney, Agent, or Firm* — Eversheds Sutherland (US) LLP

(57) ABSTRACT

Techniques for a service provider network to determine a subset of available metric data associated with an entity in a cloud computing environment are discussed herein. A system can receive metrics associated with a service and determine a subset of the metrics that represents service performance. In some examples, the system can identify a frequency of unique application activity over time in a dynamic data stream, and report metric data to a client device based on the frequency.

17 Claims, 8 Drawing Sheets

DYNAMIC METRIC DETERMINATION BY A MODEL

BACKGROUND

Cloud-based computing environments may provide many different types of services to subscribers, such as on-demand computing services, data-management services, software-execution services, application-hosting services, and various other types of services. Due to the ease of having the serverless computing environment provide and manage the computing infrastructure on behalf of subscribers, users continue to utilize cloud-based networks to provide and/or host services that are accessible over the Internet.

A monitoring service may collect relatively large amounts of data from a service for determining performance of the service. Further, additional data may be continuously gathered from the service over time thereby generating even more data for consideration by the monitoring service. Determining which portions of the collected data to present to a subscriber of the monitoring service can vary according to an amount of available computational resources. For example, a computing device assessing service performance from the collected data may have a limited amount of memory and/or processing resources available which can affect accuracy of performance determinations by the computing device. In addition, service performance information sent to the subscriber may not reflect actual service performance due to the monitoring service selecting or processing certain portions of collected data.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
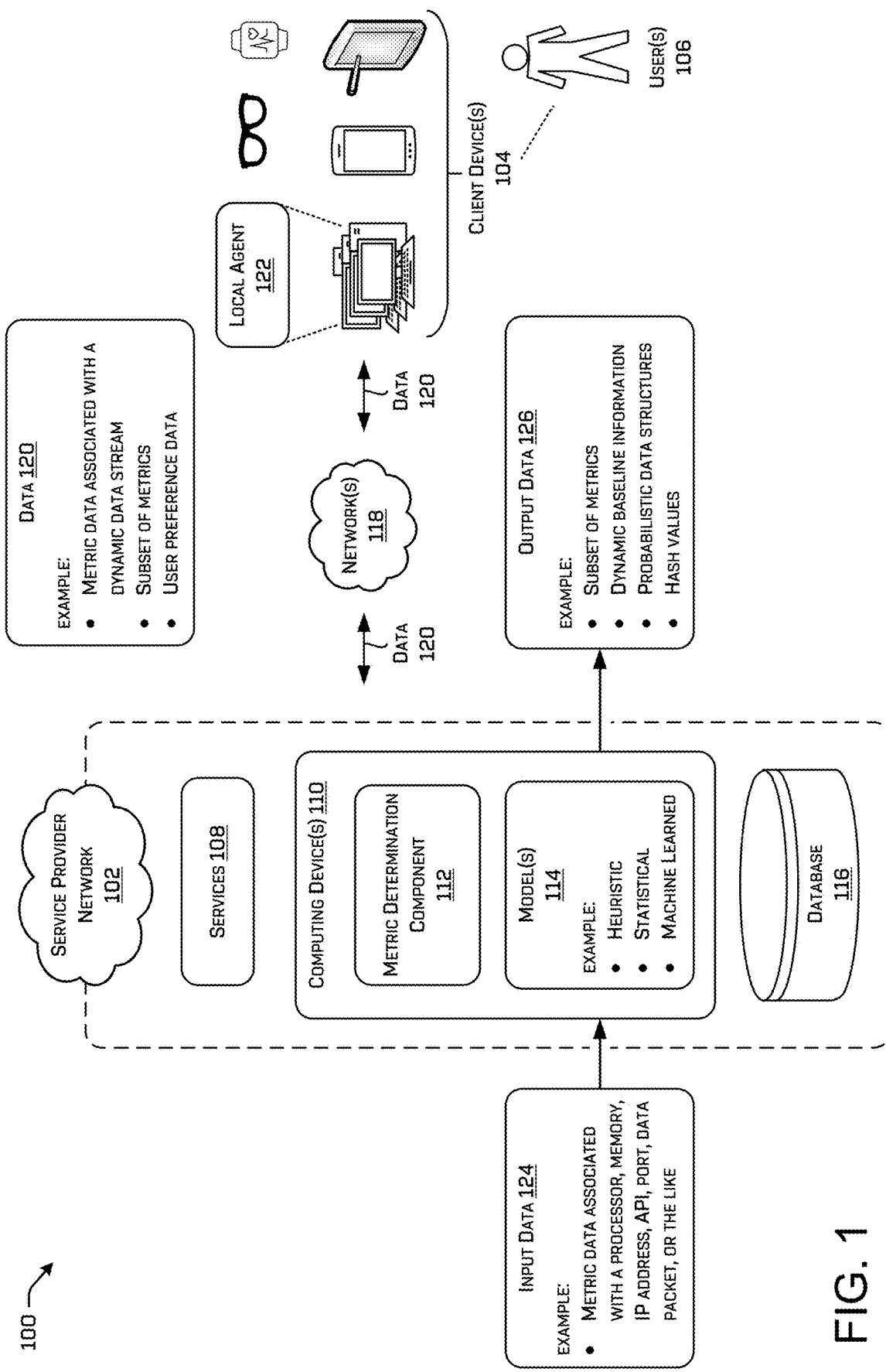
FIG. 1 illustrates a system-architecture diagram of an example environment for determining metrics associated with a service provider network for sending to a client device.

This disclosure relates to techniques for automatically determining a subset of available metric data associated with an entity in a cloud computing environment. A system can receive metrics associated with a service provided by a service provider network operating in the could computing environment, and identify which metrics to forward for presentation on a client device. The metrics can indicate performance associated with a processor, memory, network element, or the like, over a time period. The system can implement a model to process metric data associated with different time periods, and to determine a subset of the metric data for sending to the client device. In various examples, the service can be associated with a dynamic data source that continuously receives new data, and the model can determine metrics that are indicative of service performance for subsequent time periods. By comparing metric data associated with different times to one to another and/or to baseline information as discussed herein, the system can identify a frequency of various metrics and use the frequency to determine which metrics to transmit to the client device.

In some examples, the system can automatically determine relevant metric information from among a data set associated with an internet protocol (IP) address, an application program interface (API), a processor, a memory, a network element, an operating system, or other entity. The system can be associated with or otherwise receive dynamic input data from one or more services using an API to exchange data over a service provider network. The system can implement an aggregation component to receive metrics representing possibly millions or billons of metric values collected over a period of time. The metric values can, for example, indicate a time or an action associated with a processor (e.g., time to perform the action, process types, etc.), a memory (e.g., free, used, cached, buffered, etc.), and/or a network element (e.g., a port, interface, address, etc.), just to name a few. The system can, in various examples, select a subset of the metrics from among the millions or billions of metric values, and transmit the selected metrics as part of a metric report summarizing performance by the IP address, the API, or other entity.

Generally, the system can receive, as input data, a data set representing metrics collected over a first time period. For example, the system can receive metrics associated with an API for 60 minutes (or other time). The system can approximate the data set as a probabilistic data structure, and optionally determine a hash value for the probabilistic data structure. The system can also or instead determine another probabilistic data structure and/or hash value to represent a second data set associated with a second time period before or after the first time period. By comparing probabilistic data structures representing different time periods (or hash value representative thereof), the system can identify unique metric values in one of the probabilistic data structures (e.g., cardinality). For instance, the system can identify a frequency at which certain metrics occur and determine which metrics to report to a client device based on the frequency. The system may refrain from reporting some metrics associated with activity occurring at a frequency below a threshold.

In various examples, the system can transmit data representing a metric report or summary to a client device to indicate service, API, or entity performance. In some examples, the data can include a subset of metrics determined for a time interval. The system can operate as a monitoring service to send metric reports periodically to a client device. The system can determine a hash value to represent a respective probabilistic data structure, and compare respective hash values representing different probabilistic data structures and/or different time intervals. In some examples, the system can determine a number of occurrence of each metric in a set of metrics, and output a threshold number of the most frequent metrics over one or more time periods.

In various examples, the system can analyze metric data associated with different time intervals and store a value to represent one or more of: a number of occurrences over a single time period or multiple time periods, a number of new metrics for a given time period and/or a list of most frequent metrics (e.g., top 500), just to name a few. The system can, in some examples, store the value to enable a low memory footprint of metrics (e.g., millions of metrics) for the particular time period (as compared to storing all metrics for the time period). In some examples, values from different time periods can be compared one to another to identify a rate at which metrics change for a service, an IP address, an API, or other entity (e.g., a rate at which the IP address accesses a new resource).

In some examples, the system can represent a streaming monitoring service that is configured to determine metrics for one or more services provided in association with the service provider network. For example, the system can comprise a computing device configured to sample, gather, aggregate or otherwise receive data representing metrics for processor, memory, and/or network activity associated with the service provider network. In various examples, the computing device can implement a model or component to identify a pattern of metrics by an entity over time, such as how frequently pre-determined metrics occur for an IP address.

By way of example and not limitation, a service can transmit a subset of metrics via the service provider network and one or more third-party networks (e.g., an Internet provider) to a client device subscribing to the service. The service provider network may comprise clusters of managed servers stored in data centers located across geographic areas. The service provider network may be a distributed network through which users (often customers) may interact via respective client devices to manage or otherwise interact with services provided by the service provider network which may include a monitoring service to determine which metric activity to report to the client device subscribing to the monitoring service.

The system can represent or otherwise utilize a cloud platform that provides or hosts various types of services (also referred to as backend service). For instance, backend services may include business-application services, financial-institution services, healthcare services, and so forth. Client devices often interact or access these backend services over a network, such as the Internet, using Application Program Interface (API) calls that define an operation or interaction that the client device is requesting be performed. For example, an application or agent may be running locally on a client device to receive the subset of metrics, provide preferences for receiving metric data, etc. Data associated with the cloud platform can be used as input data to one or more models or components as described herein.

The system can employ a variety of different models to perform the techniques described herein. As described herein, models may be representative of machine learned models, statistical models, heuristic models, or a combination thereof. That is, a model may refer to a machine learning model that learns from a training data set to improve accuracy of an output (e.g., a prediction). Additionally or alternatively, a model may refer to a statistical model that is representative of logic and/or mathematical functions that generate approximations which are usable to make predictions.

The techniques described herein can improve the quality of data transmitted using the service provider network by reducing an amount of data transmitted over a network in association with reporting metric activity for a time period. For instance, the techniques can improve network efficiency (e.g., save network bandwidth, free up memory and/or processor resources, etc.) by determining a subset of available metrics for transmission to represent a larger data set of metrics. The techniques described herein can also or instead make efficient use of available computational resources of a computing device by determining a time interval for gathering metrics (e.g., relatively shorter time intervals when fewer computational resources are available and relatively longer time intervals when greater computational resources are available).

Certain implementations and examples of the disclosure will now be described more fully below with reference to the accompanying figures, in which various aspects are shown. However, the various aspects may be implemented in many different forms and should not be construed as limited to the implementations set forth herein. The disclosure encompasses variations of the examples, as described herein. Like numbers refer to like elements throughout.

FIG. 1 illustrates a system-architecture diagram of an example environment 100 determining metrics associated with a service provider network for sending to a client device. For example, a service provider network 102 can exchange data representing metric information with one or more client device(s) 104 associated with one or more user(s) 106. As shown, the service provider network 102 comprises services 108 and one or more computing device(s) 110 that further comprise a metric determination component 112, one or more model(s) 114, and a database 116. Though FIG. 1 shows the metric determination component 112 and the model(s) 114 separately for discussion purposes, functionality associated with the metric determination component 112 or the model(s) 114 can be included in the metric determination component 112, the model(s) 114, or another component or device of the service provider network 102.

In various examples, the computing device(s) 110 can determine a subset of available metrics for transmitting to the client device(s) 104 over a data communications network(s) 118 as part of data 120. Available metrics can represent metrics collected, gathered, or received in association with a service, computing device, or the like, and can vary in number based on a length of a time period, number of metrics being monitored, and so forth. The computing device(s) 110 can, for example, determine baseline data by analyzing metrics from two or more time intervals. The baseline can change over time depending on how frequently each metric occurs during a time interval. For example, the computing device(s) 110 can select, as a baseline, a threshold number of most occurring metrics from first metrics associated with a first time period and second metrics associated with a second time period subsequent the first time period.

In some examples, the computing device(s) 110 can be configured to exchange the data 120 with the client device(s) 104 can include a local agent 122 representing an interface for interacting with the user(s) 106 such as for exchanging the data 120 (e.g., sending metrics to the computing device(s) 110, outputting a subset of metrics for presentation, receiving data from the user 106, and so on). In some examples, the data 120 can represent metrics associated with activity by an IP address over a time period (e.g., a read request, a write request, or other action for a data packet). In some examples, the data 120 can represent one or more of: data associated with a service of the service 108, data associated with the client device(s) 104, a replication of a data stream, user profile data, etc.

In some examples, the service provider network 102 may comprise clusters of managed servers stored in data centers located across geographic areas. The service provider network 102 may be a distributed network through which users (often customers) may interact via the client device 104 to manage or otherwise interact with services 108 provided by the service provider network 102. The service provider network 102 may be managed by a service provider, and may provide various types of services 108, such as a video service, an on-demand computing service, a message-queuing service, a managed-database service, a software-execution service, application-hosting services, business-application services, financial-institution services, and/or other services. The services 108 may be a collection of computing resources configured to instantiate VM instances, containers, network functions, etc., and to provide other types of computing resources on demand. Other applications for the services 108 may be to support database applications, electronic commerce applications, business applications and/or other applications. The services 108 may include a monitoring service that implements the computing device(s) 110 to determine which metrics represent performance of a monitored entity, and sending such metrics as a subset of available metrics to the client device(s).

The client device(s) 104 may represent any type of computing device capable of connecting to the service provider network 102 via the data communications network(s) 118 (e.g., a third-party network) such as, but not limited to, a laptop or desktop computer, a tablet computing device, a television, a server computer, a vehicle, a watch, a wearable device (e.g., sunglasses, clothing, etc.), or a mobile telephone, just to name a few. Administrative users employed by the operator of the service provider network 102, such as administrators managing the operation of the service provider network 102, might also connect with, manage, and utilize resources provided by the service provider network 102 in a similar fashion (e.g., using the computing device(s) 110).

In some examples, the user(s) 106 of the service provider network 102 may subscribe for an account with the service provider network 102 to utilize the computing infrastructure (e.g., computing resources in data centers) supporting the services 108 (e.g., memory, processing power, auto-scaling, networking and content delivery, etc.) provided for and managed by the service provider network 102. The service provider operating the service provider network 102 may charge a fee for utilization of the computing resources to a subscriber that have computing resources provisioned to support and use the services 108.

Generally, the user(s) 106 may interact via the local agent 122 to receive or implement a service from the services 108. The user(s) 106 may be one or more of individual users, groups of users, organizations, businesses, or other entities that interact with the service provider network 102 via respective client device(s) 104. In some examples, the local agent 122 can represent software that is associated with the services 108. The local agent 122 may also, or instead, represent a user interface having one or more controls (or input controls) for the user(s) 106 to provide input usable by the metric determination component 112 to generate, update, or otherwise output a subset of metrics associated with the service provider network 102. For instance, a user can provide input to one or more controls of the local agent 122 to log into a service, provide preferences related to a presentation (e.g., the data 120) on a display device of the client device(s) 104, and/or present at least a portion of the output data 126.

The metric determination component 112 and/or the model(s) 114 can receive a variety of input data 124 such as metric data for one or more time periods, and generate output data 126 representing a subset of the metric data for a current time period. For instance, the computing device(s) 110 can implement the metric determination component 112 and/or the model(s) 114 to receive metric data representing different a time period(s), approximate the received metric data as a probabilistic data structure, and/or determine a hash value to represent the probabilistic data structure. For example, the computing device(s) 110 can receive metrics associated with a processor, a memory, an IP address, an API, a port, a data packet, or the like, for a first time period such as sixty minutes. In various examples, the metrics for the first time period can include a number of occurrences of each metric for sub time periods (e.g., for each minute of the sixty minute time period). The metric determination component 112 can, for instance, determine the hash value to represent the metrics received over the first time period including the metrics of each sub time period. In some examples, the aforementioned sixty time periods and/or 1 minute sub time periods need not be in sequence and/or may represent a different amount of time. In various examples, the first time period and the second time period may differ in length relative to one another and may be consecutive or non-consecutive time periods, depending upon examples.

In some examples, the model(s) 114 (e.g., a machine learned model, a statistical model, heuristic model, or a combination thereof) can determine the probabilistic data structure based on applying a probabilistic algorithm to at least a portion of the input data 124. Additionally, the model(s) 114 can apply a hash function to the probabilistic data structure to determine a hash value that approximates, estimates, or otherwise represents the metrics data received as the input data 124. The hash value can be stored in the database 116 for access at a later time such as for comparing to hash values determined for another time period(s). In various examples, the input data 124 can represent metrics received from one or more dynamic data sources (e.g., the client device(s) 104, a service of the services 108, the database 116, a replication of a data stream, a buffer, etc.). In some examples, the computing device(s) 110 can implement a component to aggregate the input data 124 from the services 108, the client device 104, and/or a storage device, etc.

The metric determination component 112 can, in various examples, identify differences in the respective metrics based on comparing the probabilistic data structure (or associated hash value) with a previous probabilistic data structure (or associated hash value) determined from previous metric data. Based on the comparison, the metric determination component 112 can determine a number of each of the metrics occurring in a time period or sub time period and/or a frequency of a particular metric over time. In some examples, the metric determination component 112 can select a threshold number of top occurring metrics to associate with a time interval (e.g., top 500 most repeated metrics of the 1 million metrics included in the input data, all metrics in the top 1% of frequently occurring metrics, etc.).

In various examples, the metric determination component 112 can receive additional metrics for a subsequent time interval and perform techniques to continuously output the top occurring metrics every hour, or 15 minutes (or other time determining by a model and/or user). In some examples, a time period associated with gathered metrics can vary according to an amount of metrics collected or other reasons. For instance, the metric determination component 112 can determine a time period for collecting a set of metrics based on a number of metrics to report, a type of service associated with the metrics, etc. Further discussion of functionality provided by the computing device(s) 110 can be found throughout this disclosure including in FIGS. 2 and 3.

The services 108 may, in various examples be provided by or associated with one or more data centers operated of the service provider. As known to those skilled in the art, data centers are facilities utilized to house and operate computing resources, such as computer systems and associated components. Data centers may also include redundant power, communications, cooling, and security systems. The data centers might be located in geographically disparate regions, and might also be connected to various other facilities, such as co-location facilities, and various wide area networks ("WANs"), such as the Internet.

The computing resources associated with the services 108 can be provisioned and de-provisioned as needed in an automated fashion. For example, the service provider network 102 might be configured to instantiate a new instance of a computing resource, such as a VM instance, in response to an increase in demand for a network service or other condition. Other types of computing resources might also be provisioned and de-provisioned in a similar manner. Services 108 in the service provider network 102 might also provide functionality for automatically scaling and/or descaling the computing resources based upon demand for the resources and/or other factors.

In some examples, the input data 124 can include data associated with two or more time periods such as the first time period, second time period, and/or the third time period (or other additional time periods in some examples). As mentioned, respective time periods may or may not be consecutive, or in sequence, relative to one another (e.g., occurring directly after one another). By way of example and not limitation, a first time period can be one minute, and a second time period can be different from one minute, and the second time period can occur before or after the first time period without being required to be directly after an end time of the first time period or directly before a start time of the first time period. Thus, the input data 124 can include, for example, client device data, network data, IP address activity data, port data, or other data that is associated with one or more time periods.

The model(s) 114 can be implemented to compare a first data structure (or points thereof) for the first time period to a second data structure (or points thereof) for the second time period, and output data indicating a threshold number of most occurring or most frequent metrics from the second data structure based on the comparing.

In various examples, the first metrics and/or the second metrics can be associated with content transmitted in associated with at least one geographical region or at least one Content Delivery Network. For example, the input data 124 can be associated with one or more geographical regions, Content Delivery Networks, and the like. The first activity can represent network activity exchanged with a Content Delivery Network, and the second activity can represent different network activity exchanged with the Content Delivery Network over a different time period. In some examples, data associated with another Content Delivery Network and/or another geographical region can also be received as the input data 124.

Figure 2A:
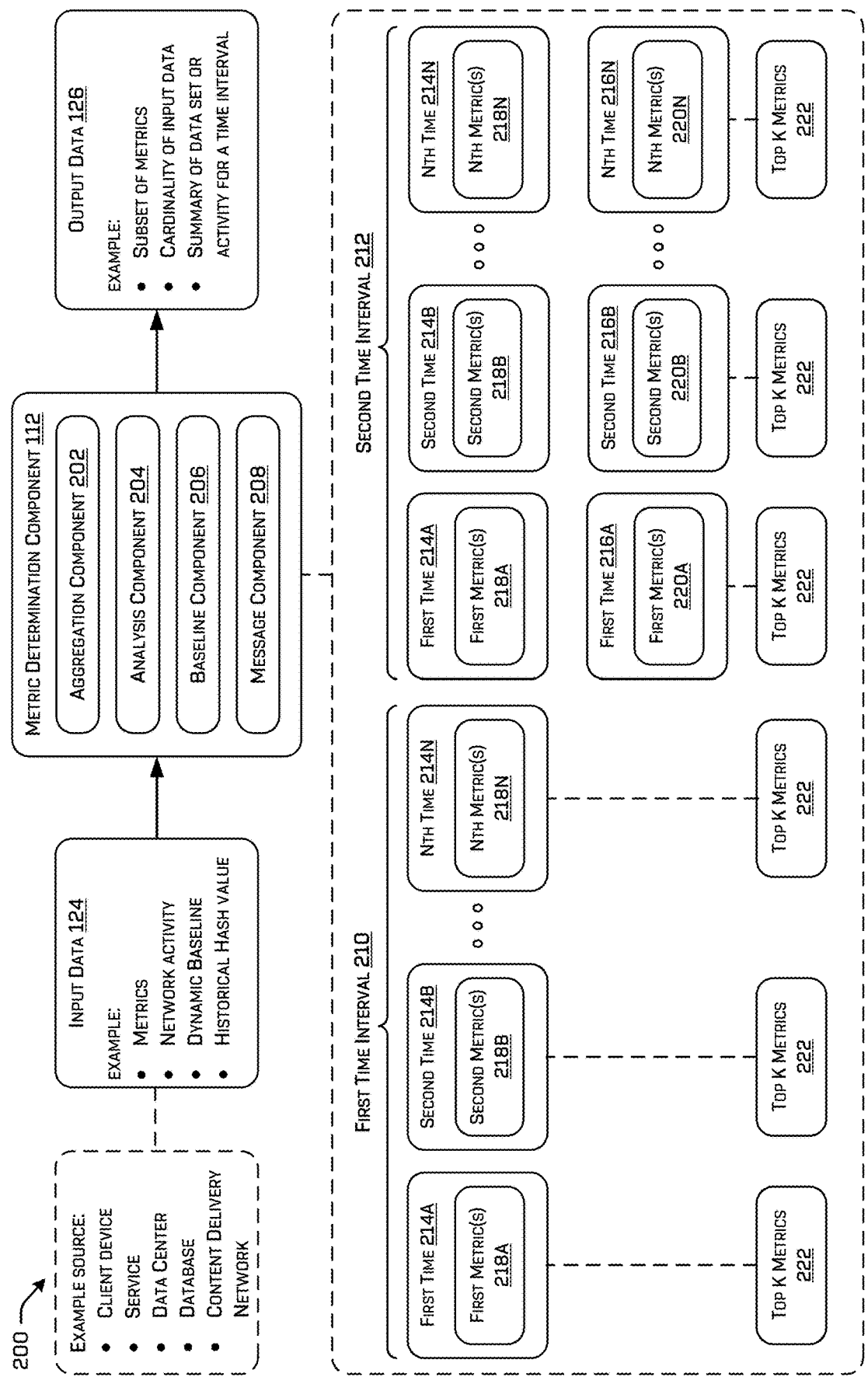
FIG. 2A illustrates first part of a diagram of an example service provider network implementing example components to perform the techniques described herein.

FIG. 2A illustrates a first part of a diagram 200 of an example service provider network implementing example components to perform the techniques described herein. For example, the service provider network 102 can implement the computing device(s) 110 and the metric determination component 112 of FIG. 1. As shown in FIG. 2A, the metric determination component 112 further comprises an aggregation component 202, an analysis component 204, a baseline component 206, and a message component 208. Though depicted in FIG. 2A as separate components of the metric determination component 112, the functionality associated with the aggregation component 202, the analysis component 204, the baseline component 206, and/or the message component 208 can be included in a different component of the service provider network 102 or the computing device(s) 110. In some instances, the components described herein may comprise a pluggable component, such as a virtual machine, a container, a serverless function, etc., that is capable of being implemented in any service provider network and/or in conjunction with any API gateway.

The diagram 200 further depicts the metric determination component 112 associated with a first time interval 210 and a second time interval 212. In various examples, the first time interval 210 and the second time interval 212 may or may not be consecutive, or in sequence, relative to one another (e.g., occurring directly after one another). Further, the first time interval 210 and the second time interval 212 may have a same length while in other examples the lengths may differ.

The first time interval 210 includes a first time 214A, a second time 214B, up to an Nth time (collectively "times 214") and the second time interval 212 includes a first time 216A, a second time 216B, up to an Nth time 216N, where N is an integer (collectively "times 216"). As shown in FIG. 2A, the first time 214A comprises one or more first metrics 218A, the second time 214B comprises one or more second metrics 218B up to an Nth time 216N including Nth metric(s) 218N (collectively "metrics 218"). FIG. 2A further illustrates the first time 216A comprising one or more first metrics 220A, the second time 216B comprises one or more second metrics 220B up to an Nth time 216N including Nth metric(s) 220N, where N is an integer (collectively "metrics 220"). The first metric(s) 218A can represent metrics occurring during the first time 214A (e.g., a sub-interval of the first time interval 210) and the analysis component 204 can determine a number of occurrences of a metric over the first time interval 210 at a same of the metrics 218 from each respective time. The analysis component 204 may also or instead determine a frequency of the metric for the first time interval 210 and/or frequency of a particular metric in multiple time intervals (e.g., also including the second time interval 212).

In various examples, the metrics 218 and the metrics 220 can be received by metric determination component 112 responsive to completion of a respective time interval. That is, the metric determination component 112 can receive metric data over time from a dynamic data source, and process the metric data to determine cardinality of the input data over time. In examples, the techniques can include determining a data structure to represent metric data (e.g., the metrics 218 for the times 214 or the metrics 220 for the times 216) over time. The data structure can represent a probabilistic data structure determined based at least in part on determining computational expenses to process and/or to store each metric separately. For instance, the metric determination component 112 can apply a probabilistic algorithm to the input data 124 to generate a probabilistic data structure representative of the metrics 218 in the first time interval 210.

In various examples, the metric determination component 112 can implement the aggregation component 202 to receive the input data 124 for processing from one or more sources such as a client device (e.g., the client device(s) 104), a service (e.g., the services 108), a data center (e.g., the data center 504 of FIG. 5), a database (e.g., the database 116), a Content Delivery Network, and so on. The metric determination component 112 can, in some examples, generate the output data 126 representing cardinality of the input data (e.g., between the metrics 218 of the first time interval 210 and the metrics 220 of the second time interval 212) based on the input data 124. The output data 126 can, in some examples, represent a probabilistic data structure summarizing a data set received as the input data 124.

The aggregation component 202 can represent functionality to sample, receive, collect, or otherwise determine data for processing by a component of the computing device(s) 110. In some examples, the aggregation component 202 can sample, receive, otherwise determine aggregated metrics which can include one or more time intervals and respective metrics for processing (shown as aggregated metrics 224 in FIG. 2B). The aggregation component 202 can also or instead access, receive, or gather data from a database (e.g., the database 116) such as user preference data or baseline information (e.g., previously reported metrics) for a time interval. As discussed herein, baseline information can be determined by comparing the metrics of one or more previous time intervals and metrics from a current time interval. For example, as new metric data is received over time the baseline component 206 can add, modify and/or delete a list of metrics associated with a time interval. In some examples, the list of metrics can be stored in the database 116 and updated based on a comparison between metrics of the current time interval with metrics in a previous interval. To save computational resources, the list of metrics, data structures, hash values, etc. can be deleted from the database 116 (or other storage device) after the passage of at least two time intervals as the list of metrics is updated instead of being stored indefinitely.

Generally, the analysis component 204 can represent functionality to analyze data associated with the service provider network 102 such as the metric data from the aggregation component 202. The analysis component 204 can represent functionality to generate the output data 126 including, for example, determining relevant metrics to report for a particular time interval. For example, sampled data can be analyzed for a first period of time to establish a first pattern (or data structure) of metric activity that can be compared to a second pattern of metric activity for a second period of time after the first period of time. By comparing the patterns of metric activity from different time periods, the analysis component 204 can identify a total number of occurrences for a metric at a particular time (e.g., the first metric(s) 218A at the first time 214A).

In various examples, the analysis component 204 can receive the aggregated metrics and determine data structures to represent metrics of a time interval. For example, the analysis component 204 can determine a first probabilistic data structure for the metrics 218 of the first time interval 210 and a second probabilistic data structure for the metrics 220 of the second time interval 212. The data structure can, in other examples, include a graph representation of the metrics 218 over the first time interval 210.

In some examples, the analysis component 204 can determine a threshold number of metrics for a time interval and/or sub-time of the time interval. For example, the first time interval 210 can include one or more instances of determining top k metrics 222, where K is an integer. As shown in FIG. 2A, the top k metrics 222 are associated with each of the times 214 of the first time interval 210 and each of the times 216 of the second time interval 212. In various examples, the top k metrics 222 can represent a threshold number of metrics that serve as a baseline for a given time period and can vary from the first time interval 210 to the second time interval 212 and/or from the first time 214A to the second time 214B, and so on. Although shown as the same top k metrics 222 across the times 214, in various examples, the analysis component 204 can determine different top k metrics for each sub-time (e.g., the first time 214A, the second time 214B, the first time 216A, the second time 216B, etc.) and/or each time interval. In various examples, the message component 208 can configure a message for sending to a client device that identifies some or all of the top k metrics 222. The message, and future messages, can be sent by the message component 208 based on a request (e.g., from device or user) and/or at predetermined intervals, just to name a few.

In some examples, the second time interval 212 can include the metrics 218 and the metrics 220 usable for processing by the metric determination component 112. During the second interval 212, for instance, the analysis component 204 can output the top k metrics 222 associated with the first times 214 and process the metrics 218 and the metrics 220 to identify the most frequently occurring metrics among the metrics 218 and the metrics 220 which can serve as a new baseline as further described herein. As an example, for the first time interval 210, the top k metrics 222 can be computed for each time 214A, 214B, etc., (e.g., every minute) based on a probabilistic data structure for a respective time. For instance, the top k metrics 222 for the first time 214A can be determined based on the probabilistic data structure for the metrics 218A indicating a frequency for each metric (e.g., frequency information), and selecting a threshold number of the most frequently occurring metrics. The metrics 220 can be collected over the second time interval 212 for use in determining the top k metrics for a subsequent time interval.

Figure 2B:
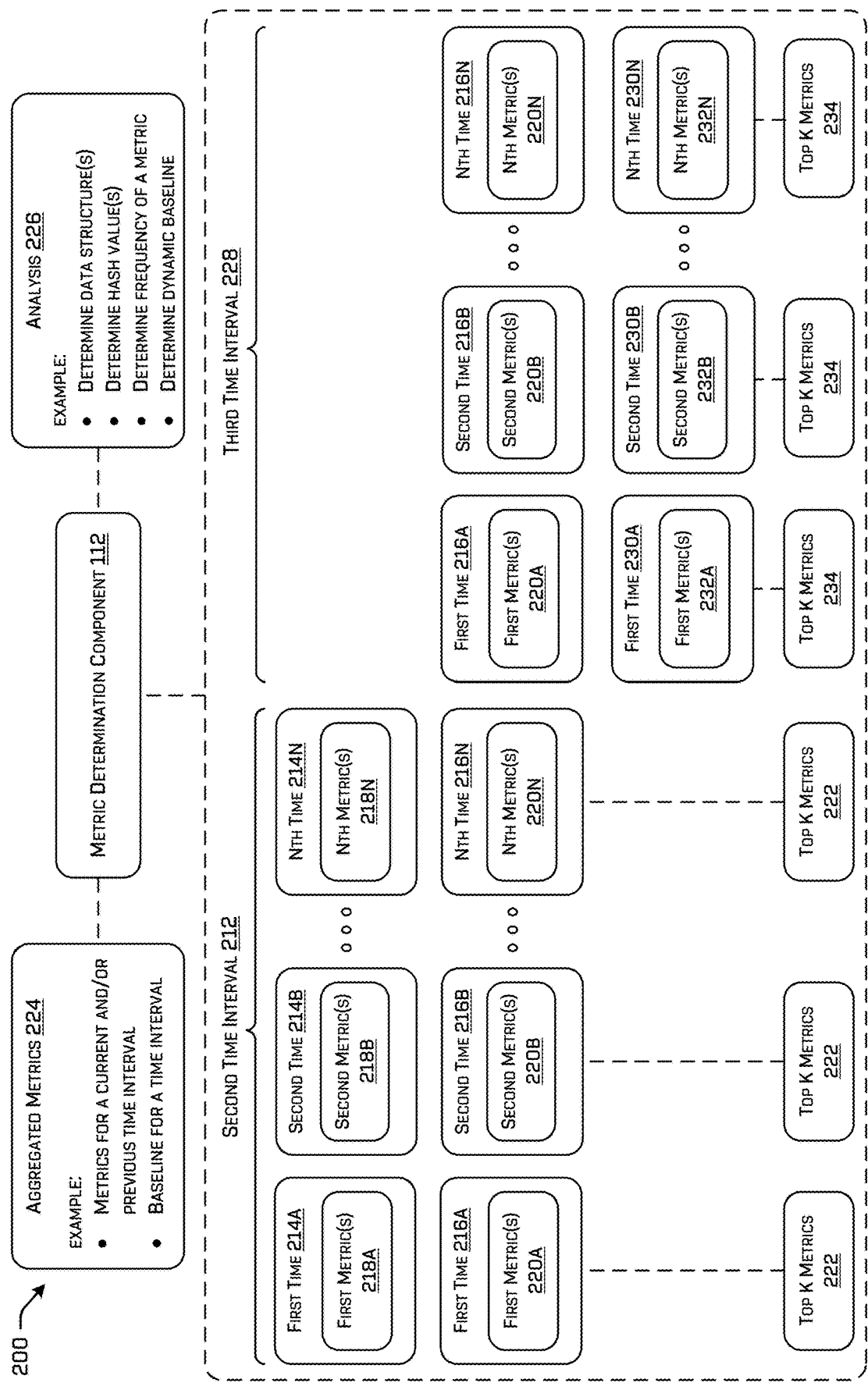
FIG. 2B illustrates a second part of the diagram of the example service provider network implementing example components to perform the techniques described herein.

FIG. 2B illustrates a second part of the diagram 200 of the example service provider network implementing example components to perform the techniques described herein. FIG. 2B shows the metric determination component 112 determining the aggregated metrics 224 and performing the analysis 226. FIG. 2B further depicts a third time interval 228 comprising a first time 230A, a second time 230B, up to an Nth time 230N (collectively "times 230"). As shown in FIG. 2B, the first time 230A comprises one or more first metrics 232A, the second time 230B comprises one or more second metrics 232B up to an Nth time 230N including Nth metric(s) 232N (collectively "metrics 232").

In some examples, the analysis component 204 can determine a threshold number of metrics for the third time interval 228 based on identifying the most frequently occurring metrics among the metrics 218 (or probabilistic data structure thereof) and the metrics 220 (or probabilistic data structure thereof). The analysis component 204 can, for example, determine top k metrics 234 for the third time interval 228 and/or for each of the times 230 (e.g., different top metrics for the time interval collectively and/or for the first time 214A (e.g., the first minute of a sixty minute time interval). The top k metrics 234 can be determined based on data associated with the metrics 218 and the metrics 220 of the second time interval 212. The third time interval 228 does not show the metrics 218 associated with the first time interval 210 to indicate that the metrics 218 have been removed from storage or memory at the beginning of the third time interval 228. In a similar way. the analysis component 204 can determine a new baseline for a fourth time interval using the metrics 220 and the metrics 232, in various examples.

The analysis component 204 can, in some examples, determine a hash value representing a respective data structure, or metrics thereof, for a time interval. In various examples, the hash value can be stored in a storage device such as the database 116 for access at a later time to compare with a subsequent hash value representing metrics of a subsequent time interval. For example, a first hash value representing the metrics 218 of the first interval 210 can be stored in the database 116 and accessed for comparing to a second hash value representing the metrics 220 of the second time interval 212.

The analysis component 204 can, as part of the analysis 226, determine data structure(s) and/or hash value(s) to represent metrics associated with one or more time intervals. In some examples, the analysis component 204 can determine a frequency of a particular metric in the metrics (e.g., the first metric(s) 220A, the second metric(s) 220B, etc.) for a time (e.g., the first time 216A, the second time 216B, etc.) or time interval. In some examples, the analysis component 204 can determine a change in the particular metric(s) between various times and/or time intervals. In various examples, the analysis component 204 can determine a change in frequency of the particular metric(s) based on the change from a first time to a second time and/or from a first time interval to a second time interval. The analysis component 204 can, in some examples, compare, merge, or otherwise analyze respective hash values of a time or time interval to determine the frequency (or change in frequency over time) of a metric.

In some examples, the baseline component 206 can determine a baseline for using to compare with metrics of subsequent time interval, and dynamically change the baseline over time as metrics associated with additional time intervals are received. To determine an initial baseline, for example, the baseline component 206 can determine the top k metrics 222 based on the most frequent metrics among the metrics 218 of the first time interval 210. In some examples, the metrics from at least two time intervals (e.g., the metrics 218 and the metrics 220) can be compared one to another to identify a threshold number of metrics for saving as a baseline value (e.g., the top k metrics 234) in a storage device. With each new set of metrics received over time, the analysis component 204 and/or the baseline component 206 can compare a number of occurrences and/or frequencies of various metrics over multiple time intervals, and replace the baseline value in the storage device with a new baseline value computed from metrics associated with a recently received time interval.

The message component 208 can represent functionality to generate, configure, or exchange a message between the computing device(s) 110 and another device such as the client device(s) 104. For example, the message component 208 can configure a message for sending to the client device(s) 104 based on the analysis component 204 determining representative metrics of a time interval (e.g., the top k metrics 222 or the top k metrics 232). The message can be included in the data 120 to notify the client device(s) 104 of the metrics associated with a service. The message component 208 can configure messages for sending to a device periodically depending upon a rate at which the user prefers to receive such data (e.g., depending on a level of desired monitoring).

By way of example and not limitation, a client device can provide a service to another device in a cloud computing environment. For instance, the client device can pay a fee to a service provider to provide a gaming service to the other device over a service provider network in the cloud computing environment. To ensure that the gaming service performs as expected (e.g., minimizes delays caused by a network, a processor, and/or memory to deliver content or otherwise exchange data), the client device can implement a monitoring service to gather metrics associated with the gaming service over time. The metrics can, for instance, be associated with a network time to transmit or receive gaming content, a processor time to exchange data such as during a live gaming event, a number of data packets processed or in memory for a time period, and so on. The monitor service can use the metric determination component 112 to provide metrics indicative of performance by the gaming service. By providing metric information at different intervals, the client device (or user thereof) can determine whether changes to a parameter or setting of the gaming service, or resources that improve data exchanges (e.g., minimize delays or impacts to computational resource) using the gaming service (e.g., by device receiving data associated with the gaming service). The metric information provided by the metric determination component 112 (e.g., the output data 126) can be based at least in part on determining data structures, hash values, baseline values, and so on, as described herein.

The computing device(s) 110 can include a training component (not shown) to provide functionality to train a machine learning model usable to implement one or more of the techniques discussed herein. In some examples, the training component can include training data that has been generated by one or more machine learned models or components described herein. For example, the training component can receive user information, metric pattern data, approximations of a data set, etc. for use as training data. Third-party labeled training data can also or instead be used for training in various examples.

In some examples, the computing device(s) 110 can implement the training component to improve approximations of a data set. In some examples, ground truth approximations may be determined over time based on probabilistic data structures (either hand labelled or determined by another machine learned model) and such ground truth approximations may be used to determine a pattern of a particular metric relative to other metrics.

As mentioned, in various examples one or more components (e.g., the analysis component 204, the baseline component 206, etc.) can include or access a database (e.g., the database 508 of FIG. 5 or the database 116), a container registry, a memory, or other storage device to store network data, user data, and other data usable for implementing the techniques discussed herein. Some stored data can be used as input data (or training data) into a model as described herein.

Figure 3:
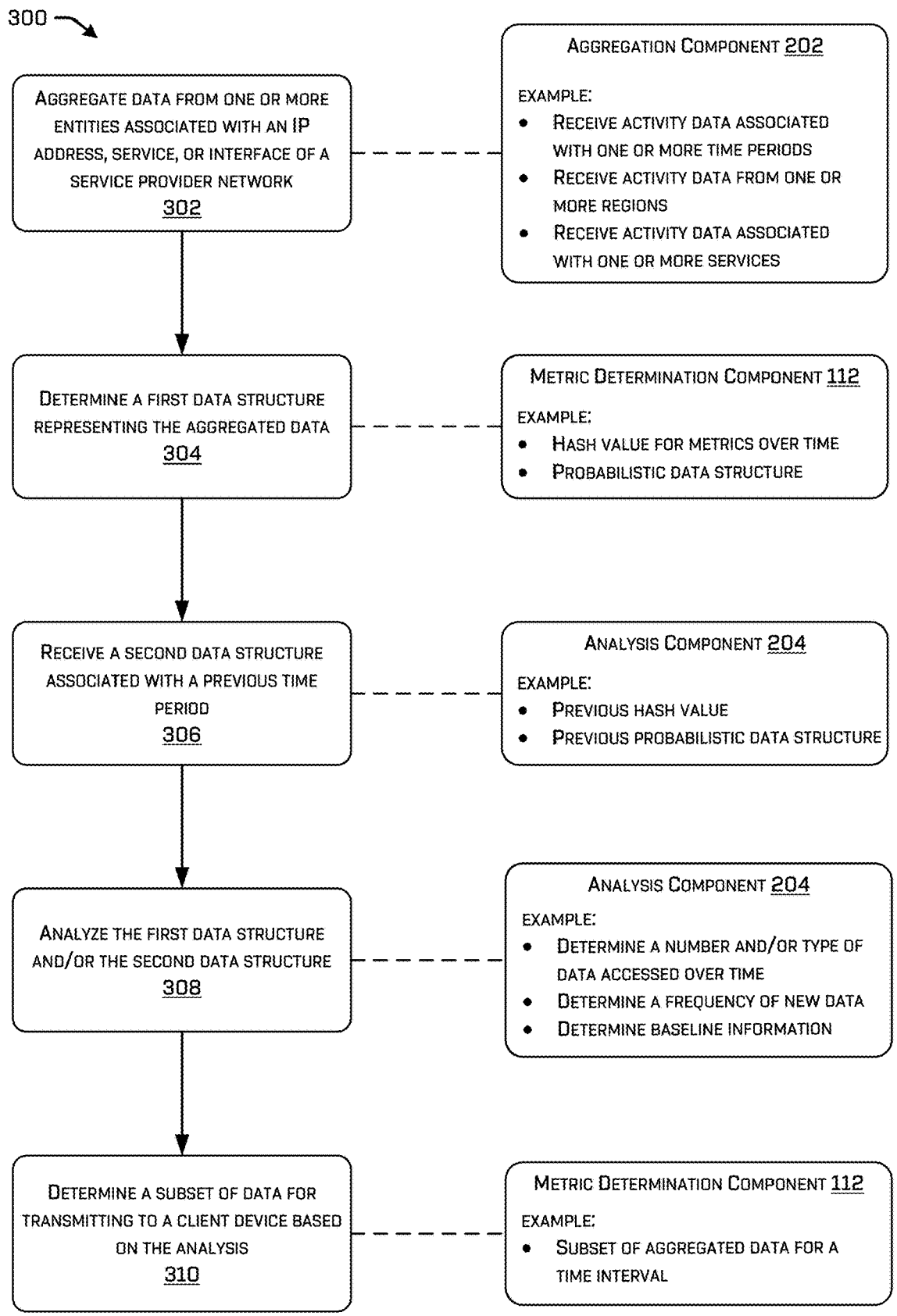
FIG. 3 is a pictorial diagram illustrating an example process by an example computing device to determine metrics based on comparing data structures of different times.

FIG. 3 is a pictorial diagram illustrating an example process 300 an example process by an example computing device to determine metrics based on comparing data structures of different times as described herein. The example process 300 may be implemented by a computing device such as the computing device(s) 110 of FIG. 1 or the computing device(s) 700 of FIG. 7. By way of example and not limitation, the example process 300 may be used to reduce a size of a data set by outputting an approximation of the data set. The data set may be sufficiently large such that available computational resources are unable to store all the data in the data set, and the computing device can determine the best approximations of data sets representing different time intervals. Regardless of whether the data set comprises metric data, or other data types, the computing device can determine which data in the data set represents the most meaningful or useful information, and send a subset of the data set to a device for presentation.

An operation 302 can include aggregating data from one or more entities associated with a service provider. For example, the aggregation component 202 can receive data from an entity comprising one of: a service, a data center, a database, a client device, a Content Delivery Network, or other entity associated with the service provider network 102. As an example, the computing device(s) 110 can receive metric data associated with an IP address, an API, a client device, a service, or other entity.

In some examples, the aggregation component 202 can receive first metric data associated with a first time period and second activity data associated with a second time period (e.g., from the database or from a device such as the client device). The aggregated data can represent metric data associated with one or more time periods, metric data from one or more geographical regions (e.g., different data centers, Content Deliver Networks), metric data associated with one or more services (e.g., one or more of the services 108), and the like.

An operation 304 can include determining a first data structure representing the aggregated data. For example, the operation 304 can include the analysis component 204 analyzing the aggregated data to output a probabilistic data structure representing metrics included in the aggregated data. The probabilistic data structure can, for example, represent a number of occurrences of each metric over a time period. In some examples, the metric determination component 112 can determine an additional probabilistic data structure for second metric data associated with a different time period. The second metric data may be associated with a time period that comes before or after the aggregated data represented by the first data structure.

In some examples, the operation 304 can include the metric determination component 112 determining a hash value to represent the data structure and/or the metrics associated with the time period. For example, the computing device(s) 110 can apply a hash function to the aggregated data and/or to a data structure representing the aggregated data.

An operation 306 can include receiving a second data structure associated with a previous time period. For instance, the operation 304 can include the analysis component 204 receiving a probabilistic data structure representing metrics associated with a previous time period from the database 116. In various examples, the previous time period may have a same or different length as the time period associated with the aggregated data. In some examples, the second data structure can also or instead represent a hash value derived from a previous probabilistic data structure.

An operation 308 can include analyzing the first data structure and/or the second data structure. For example, the operation 308 can include the analysis component 204 generating data indicative of a variation between metrics represented by the first data structure and additional metrics represented by the second data structure. For example, the analysis component 204 can determine a number and/or a type of each metric included in the first data structure and/or the second data structure. In some examples, the difference between the first data structure and the second data structure can represent a difference between a first hash value and second hash value.

The operation 308 can include the analysis component 204 comparing respective probabilistic data structures (or data points thereof), or other representations of the aggregated data for two or more time periods (e.g., hash values), one to another to identify a difference between the first metrics and the second metrics. In various examples, the operation 308 can include comparing probabilistic data structures representing different time periods to identify unique points in one of the probabilistic data structures (e.g., cardinality).

An operation 310 can include determining a subset of data for transmitting to a client device based on the analysis. For example, the operation 310 can include the metric determination component 112 outputting a subset of the aggregated data for sending to the client device(s) 104 as part of a monitoring service, metric service, data set reduction service, or other service. In some examples, the subset of data can represent a filtered or reduced amount of metric information that approximates the performance of an entity associated with the gathered metrics (e.g., an IP address, an API, etc.).

In various examples, the metric determination component 112 can generate the subset of metrics based at least in part on a third hash value determined by merging the first hash value and the second hash value. For example, the third hash value can represent a combination of at least some of the first data associated with the first hash value and at least some of the second data associated with the second hash value (e.g., positions of the first hash value can be combined with positions of second hash values).

Figure 4:
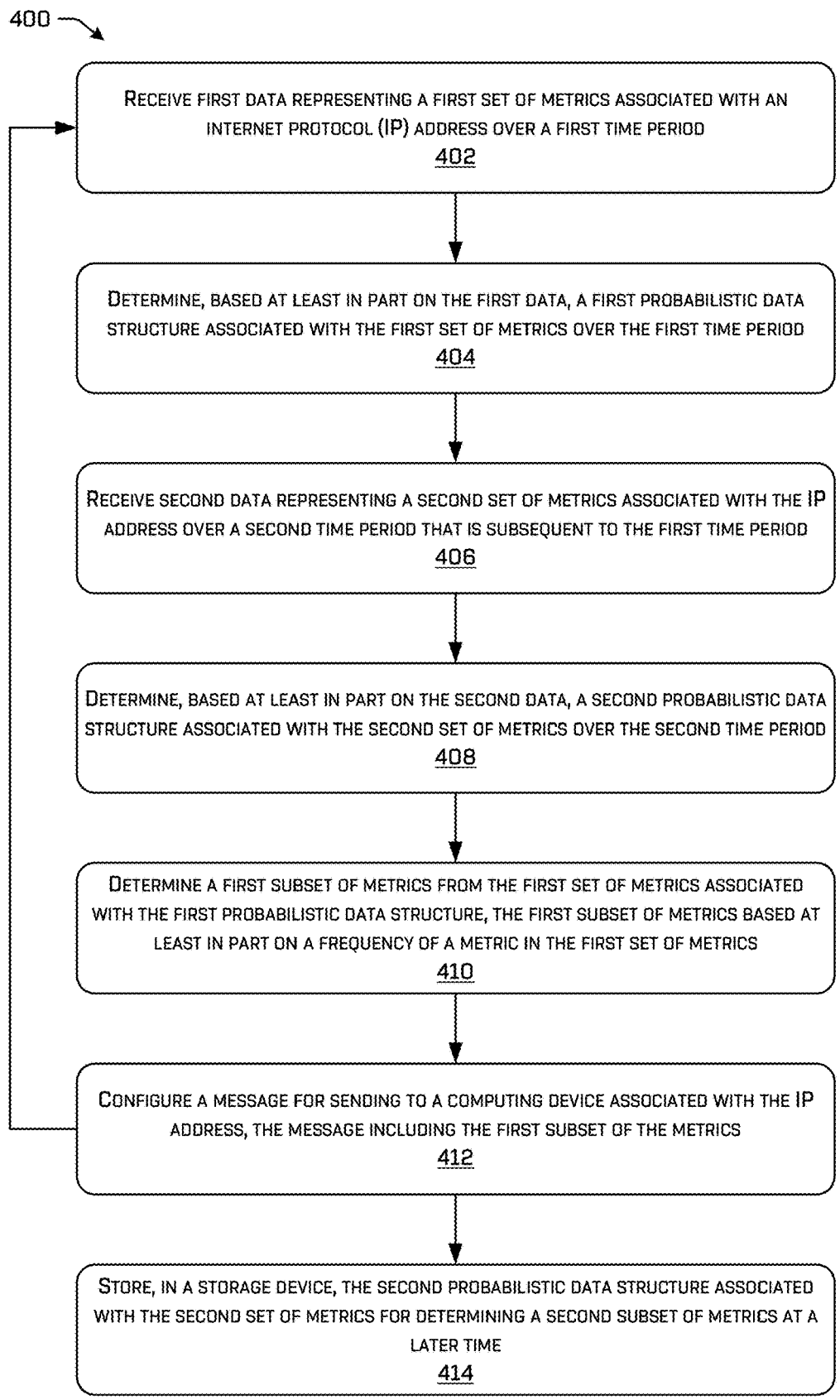
FIG. 4 is a flow diagram of an example method for determining a subset of metrics associated with a service, IP address, or an application.

FIG. 4 is a flow diagram of an example method 400 for determining a subset of metrics associated with a service or an application. For example, the service provider network 102 can receive a data set of metrics associated with an IP address and determine which subset of metrics represent performance of the service or the application for a time interval.

At 402, the metric determination component 112 associated with the service provider network 102 may receive first data representing a first set of metrics associated with an internet protocol (IP) address over a first time period. For instance, the metric determination component 112 can receive the input data 124 representing metrics received in association with an IP address, a client device, a port, and the like. In some examples, the first data is associated with a data stream that changes dynamically over the first time period. In some examples, the aggregation component 202 can sample, access, or otherwise receive the first data representing activity associated with one or more of the services 108. The first data can represent, for instance, metrics associated with a process, memory, network element, or the like. The first data can include metrics associated with a time or an action of a resource interacting with an IP address (e.g., a read request, a write request, a request to view data, etc.).

At 404, the metric determination component 112 associated with the service provider network 102 may determine, based at least in part on the first data, a first probabilistic data structure associated with the first set of metrics over the first time period. The metric determination component 112 can, for example, apply a probabilistic data structure algorithm to the first data to approximate a first number of occurrences for each metric of the first set of metrics over the first time period.

At 406, the metric determination component 112 associated with the service provider network 102 may receive second data representing a second set of metrics associated with the IP address over a second time period that is subsequent to the first time period. For example, the aggregation component 202 can receive data from a client device, storage device, a service, etc. indicative of metrics gathered over the second time period.

At 408, the service provider network 102 may determine, based at least in part on the second data, a second probabilistic data structure associated with the second set of metrics over the second time period. The metric determination component 112 can, for example, apply a probabilistic data structure algorithm to the second data to approximate a second number of occurrences for each metric of the second set of metrics over the first time period.

At 410, the service provider network 102 may determine a first subset of metrics from the first set of metrics associated with the first probabilistic data structure, the first subset of metrics based at least in part on a frequency of a metric in the first set of metrics. The analysis component 204 can, for example, identify or determine a number of occurrences of a metric and/or a frequency of a metric associated with a single time interval and/or multiple time intervals.

In some examples, determining the first subset of metrics can include the analysis component 204 determining a respective hash value for one or more probabilistic data structures, and comparing the hash values one to another to determine a frequency of a particular hash value. In various examples, the analysis component 204 can determine a difference between a first pattern associated with the first probabilistic data structure and a second pattern associated with the second probabilistic data structure. In some examples, the analysis component 204 may analyze the first pattern and/or the second pattern to identify a frequency of one or more metrics associated with the first time period and/or the second time period. In various examples, the analysis component 204 can determine the output data 126 based on the frequency (e.g., output a threshold number of metrics that are most frequent over the time interval (or sub-times thereof such as the first time 214A of FIG. 2)).

The operation 410 may also or instead include the analysis component 204 determining a first number of occurrences for each metric of the first set of metrics over the first time period and a second number of occurrences for each metric of the second set of metrics over the second time period. In some examples, the analysis component 204 can determine the first subset of metrics based on a number of occurrences and/or a frequency associated with a metric over the first time period and/or the second time period.

At 412, the service provider network 102 may configuring a message for sending to a computing device associated with the IP address, the message including the first subset of the metrics. For example, the message component 208 can configure a message that includes the first subset of metrics for transmission over a service provider network 102 to the client device 104. In some examples, the first subset of metrics can be presented in a user interface to a user associated with the client device.

The analysis component 204 can, for example, determine the first subset of metrics based at least in part on the first pattern and/or the second pattern indicating a threshold number of most frequent metrics. In some examples, the analysis component 204 can determine that the first number of occurrences and/or the second number of occurrences meets or exceeds a threshold value (e.g., to ensure that a minimum change has occurred). In various example, the analysis component 204 can select, as the subset of the metrics, one or more metrics from the first set of metrics and/or the second set of metrics based at least in part on a frequency of a metric occurring over time meeting or exceeding the threshold value.

In some examples, the analysis component 204 can receive one or more criteria from a model or a user of the computing device for determining the first subset of metrics. For instance, the subset of metrics can represent a threshold number of metrics based on the criteria. For instance, a user or device can provide preference data, device data, etc. for presenting metrics on a client device having limited computational resources. In some examples, the first subset of metrics can be determined based on how much information a user prefers to review and/or how much data the client device can process based on the limited computational resources.

At 414, the service provider network 102 may store, in a storage device, the second probabilistic data structure associated with the second set of metrics for determining a second subset of metrics at a later time. For example, upon receiving a third set of metrics associated with a third time period, a second subset of metrics can be determined based on accessing the second probabilistic data structure from the storage device. However, in other examples, some or all of the second subset of metrics can be considered by the analysis component 204 to determine the first subset of metrics. In various examples, the method 400 can repeat for addition metric data received at a later time.

FIGS. 3 and 4 illustrate flow diagrams of example methods or processes that illustrate aspects of the functions performed at least partly by the service provider network 102 as described in relation to FIG. 1 and elsewhere. The logical operations described herein with respect to FIGS. 3 and 4 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 3 and 4 as described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

In some examples, the techniques of process 300 and/or the method 400 may be performed by a system comprising one or more processors and one or more computer-readable media storing computer-executable instructions that, when executed by the one or more processors, cause the one or more processors to perform the operations of the methods.

Figure 5:
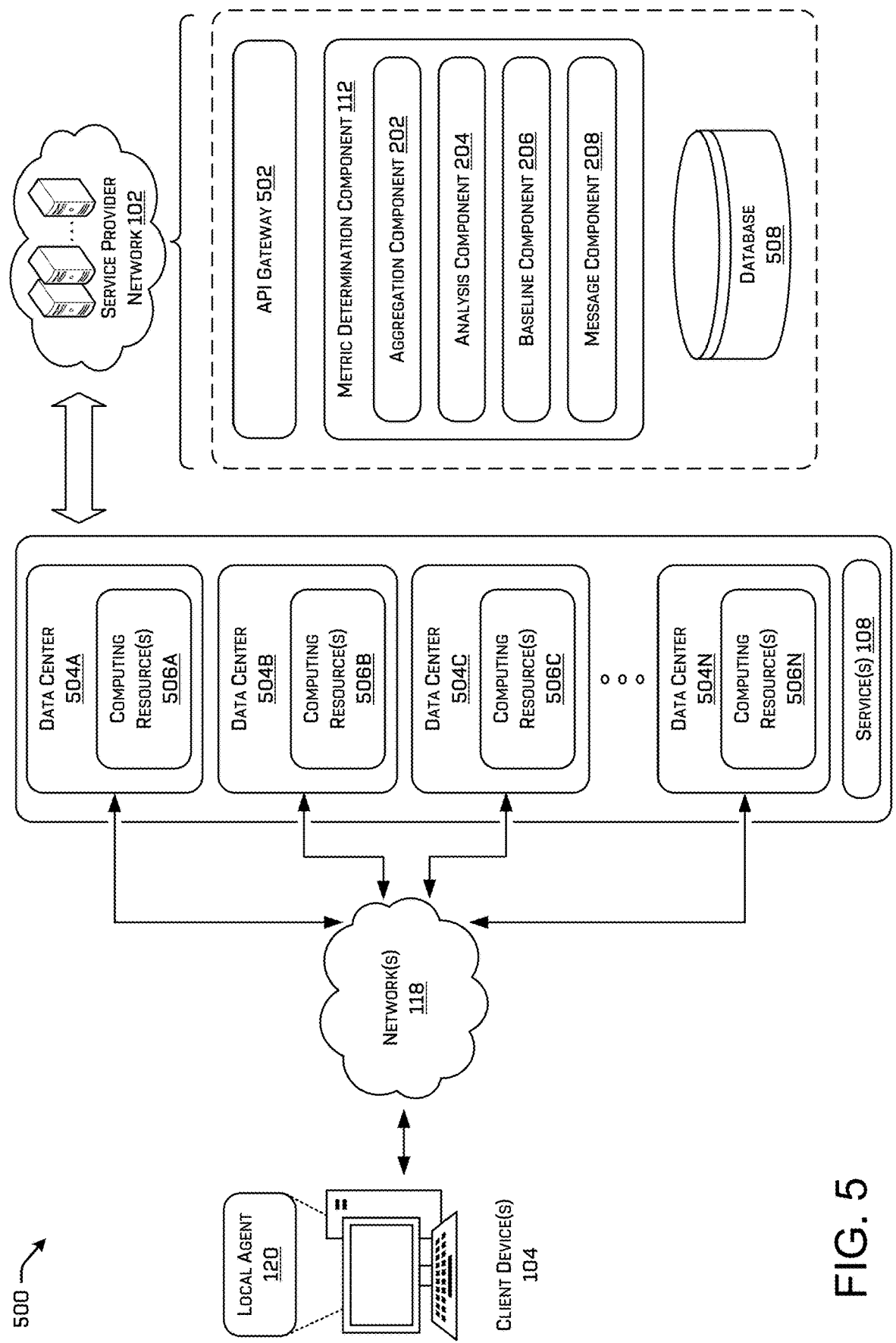
FIG. 5 illustrates a system and network diagram of an example operating environment that includes a service provider network for implementing the techniques described herein.

FIG. 5 illustrates a system and network diagram 500 of an example operating environment that includes a service provider network (that may be part of or associated with a cloud-based service network/platform) for implementing the techniques described herein. The service provider network 102 can include an API gateway 502 that may receive an API call and route the API call to a component or service. In various examples, the service provider network 102 can include the metric determination component 112 which comprises the aggregation component 202, the analysis component 204, the baseline component 206, and the message component 208.

The service provider network 102 can provide computing resources (e.g., computational resource(s) 506A, computational resource(s) 506B, computational resource(s) 506C up to an Nth computational resource(s) 506N (collectively "computational resources 506", where N can be any integer greater than 1) like VM instances, containers, serverless functions, storage, etc., on a permanent or an as-needed basis. Among other types of functionality, the computing resources 506 provided by the service provider network 102 may be utilized to implement the various cloud-based services. The computing resources provided by the service provider network 102 can include various types of computing resources, such as data processing resources like VM instances, data storage resources, networking resources, data communication resources, application-container/hosting services, network services, and the like.

Each type of computing resource provided by the service provider network 102 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. As shown, the service provider network 102 can include a database 508 for use in association with the monitoring techniques discussed herein. The service provider network 102 can also be configured to provide other types of computing resources not mentioned specifically herein.

The computing resources 506 provided by the service provider network 102 may be enabled in one example by one or more data centers 504A-504N (which might be referred to herein singularly as "a data center 504" or in the plural as "the data centers 504"). The data centers 504 are facilities utilized to house and operate computer systems and associated components. The data centers 504 typically include redundant and backup power, communications, cooling, and security systems. The data centers 504 can also be located in geographically disparate locations. One illustrative example for a data center 504 that can be utilized to implement the technologies disclosed herein will be described below with regard to FIG. 7.

The data centers 504 may be configured in different arrangements depending on the service provider network 102. For example, one or more data centers 504 may be included in or otherwise make-up an availability zone. Further, one or more availability zones may make-up or be included in a region. Thus, the service provider network 102 may comprise one or more availability zones, one or more regions, and so forth. The regions may be based on geographic areas, such as being located within a predetermined geographic perimeter.

The users and/or admins of the service provider network 102 may access the computing resources 506 provided by the data centers 504 of the service provider network 102 over any wired and/or wireless network(s) 118 (utilizing a client device 104 and/or another accessing-user device), which can be a wide area communication network ("WAN"), such as the Internet, an intranet or an Internet service provider ("ISP") network or a combination of such networks. For example, and without limitation, a device operated by a user of the service provider network 102 may be utilized to access the service provider network 102 by way of the network(s) 118. It should be appreciated that a local-area network ("LAN"), the Internet, or any other networking topology known in the art that connects the data centers 504 to remote clients and other users can be utilized. It should also be appreciated that combinations of such networks can also be utilized.

In a distributed computing environment, such as the one included in the service provider network 102 (e.g., computing-resource network), a fleet of VM instances and/or servers may have workflow or processes executed thereon to manage resources. For instance, a patch may need to be installed on each VM instance and/or resource at a particular time. In such distributed applications of workflows or processes, a load balancer may be at the front end in front of the fleet of servers where a request for a workflow comes in, and the load balancer distributes the request to execute the workflow amongst the servers.

Figure 6:
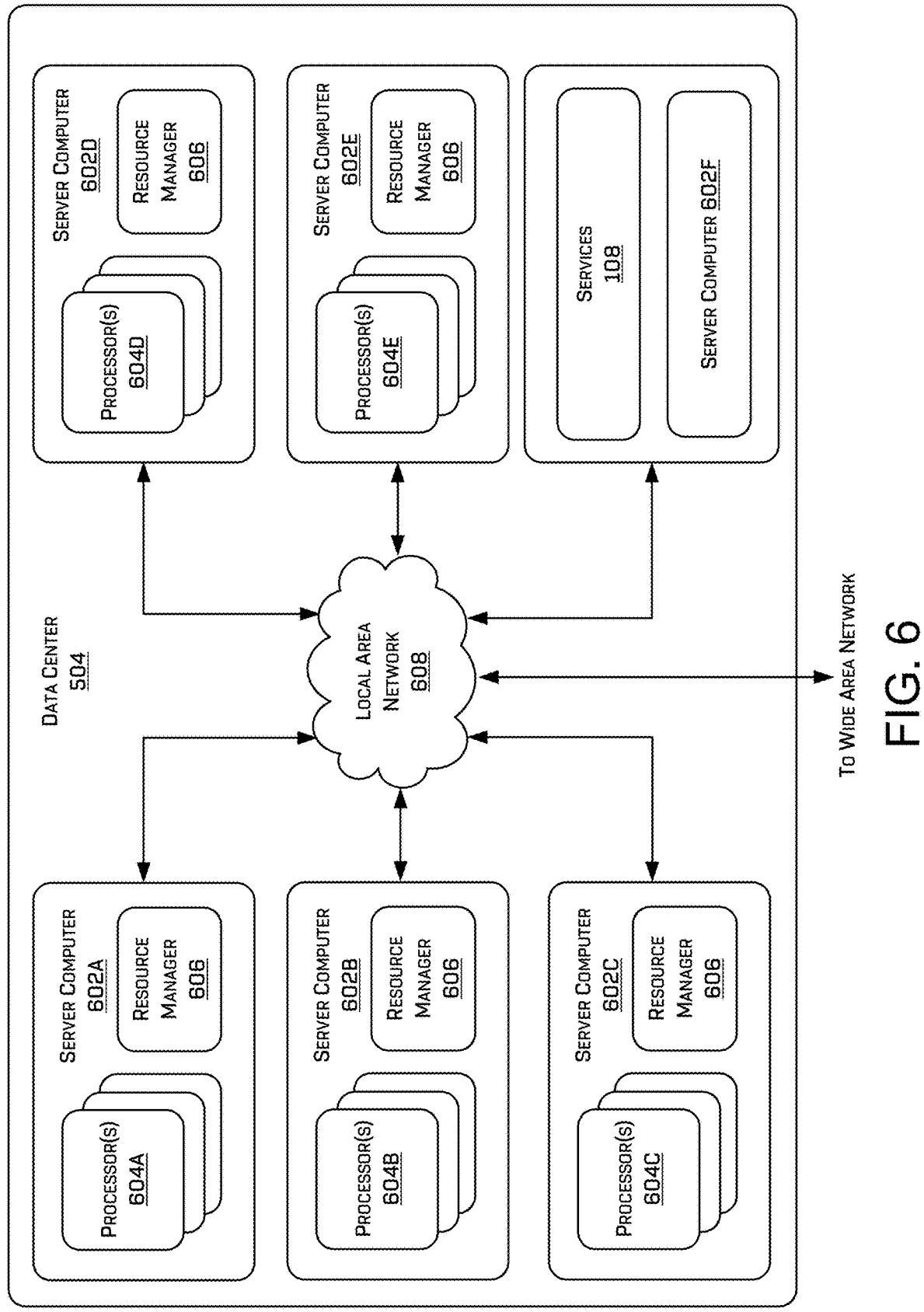
FIG. 6 is a diagram illustrating a configuration for an example data center that can be utilized to implement aspects of the techniques disclosed herein.

FIG. 6 is a diagram 600 illustrating a configuration for an example data center that can be utilized to implement aspects of the techniques disclosed herein. The example data center 504 shown in FIG. 5 includes several server computers 602A-602F (which might be referred to herein singularly as "a server computer 602" or in the plural as "the server computers 602") each having one or more processors 604A, 604B, 604C, 604D, and 604E. In some examples, the processor(s) 604 can represent a central processing unit (CPU), a graphics processing unit (GPU), a Tensor Processing Unit (TPU), an integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

The server computers 602 can be standard tower, rack-mount, or blade server computers configured appropriately for providing the computing resources described herein (illustrated in FIG. 6 as the processor(s) 604A-604E). As mentioned above, the computing resources provided by the service provider network 102 can be data processing resources such as VM instances or hardware computing systems, database clusters, computing clusters, storage clusters, data storage resources, database resources, networking resources, and others. Some of the servers 602 can also be configured to execute a resource manager 606 capable of instantiating and/or managing the computing resources. In the case of VM instances, for example, the resource manager 606 can be a hypervisor or another type of program configured to enable the execution of multiple VM instances on a single server computer 602. Server computers 602 in the data center 504 can also be configured to provide network services and other types of services, some of which are described in detail below with regard to FIG. 6.

The data center 504 shown in FIG. 6 also includes a server computer 602F that can execute some or all of the software components described above. For example, and without limitation, the server computer 602F can be configured to execute components of the service provider network 102, including the services 108.

In the example data center 504 shown in FIG. 6, an appropriate LAN 608 is also utilized to interconnect the server computers 602A-602F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 504A-504N, between each of the server computers 602A-602F in each data center 504, and, potentially, between computing resources in each of the server computers 602. It should be appreciated that the configuration of the data center 504 described with reference to FIG. 6 is merely illustrative and that other implementations can be utilized.

Figure 7:
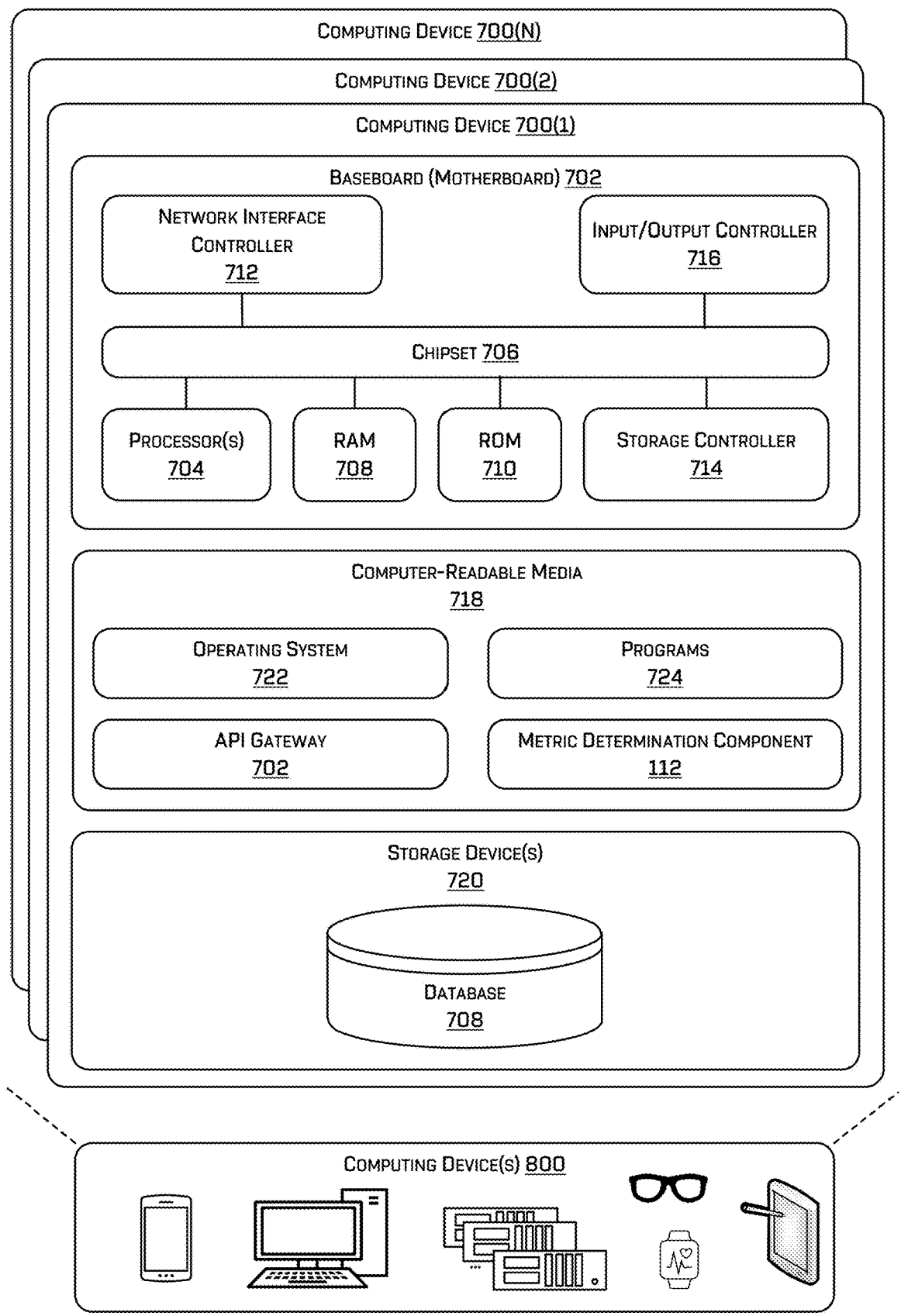
FIG. 7 is a computer architecture diagram showing an illustrative computer hardware architecture for implementing one or more computing devices to perform the techniques disclosed herein.

FIG. 7 is a computer architecture diagram showing an illustrative computer hardware architecture for implementing one or more computing devices 700 to perform the techniques disclosed herein. The computer architecture shown in FIG. 7 illustrates a conventional server computer, workstation, desktop computer, laptop, tablet, network appliance, e-reader, smartphone, or other computing device, and can be utilized to execute any of the software components presented herein.

The computing device 700 includes a baseboard 702, or "motherboard," which is a printed circuit board to which a multitude of components or devices can be connected by way of a system bus or other electrical communication paths. In one illustrative configuration, one or more processor(s) 704 (e.g., CPU, GPU, TPU, and the like) operate in conjunction with a chipset 706. The processor(s) 704 can be standard programmable processors that perform arithmetic and logical operations necessary for the operation of the computing device 700.

The processor(s) 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the processor(s) 704 and the remainder of the components and devices on the baseboard 702. The chipset 706 can provide an interface to a RAM 708, used as the main memory in the computing device 700. The chipset 706 can further provide an interface to a computer-readable storage medium such as a read-only memory ("ROM") 710 or non-volatile RAM ("NVRAM") for storing basic routines that help to startup the computing device 700 and to transfer information between the various components and devices. The ROM 710 or NVRAM can also store other software components necessary for the operation of the computing device 700 in accordance with the configurations described herein.

The computing device 700 can operate in a networked environment using logical connections to remote computing devices and computer systems through a network, such as the network(s) 118. The chipset 706 can include functionality for providing network connectivity through a network interface controller (NIC 712), such as a gigabit Ethernet adapter. The NIC 712 is capable of connecting the computing devices 700 over the network(s) 118. It should be appreciated that multiple NICs 712 can be present in the computing device 700, connecting the computer to other types of networks and remote computer systems.

The computing device 700 can be connected to one or more computer-readable storage media 718 storing software components for the computer device 700, and one or more mass storage devices 720 for storing data. The computer-readable storage media 718 can store an operating system 722, programs 724, the API gateway 502, and the metric determination component 112, which have been described in greater detail herein. The mass storage device 720 can be connected to the computing device 700 through a storage controller 714 connected to the chipset 706. The mass storage device 720 can consist of one or more physical storage units. The storage controller 714 can interface with the physical storage units through a Small Computer System Interface ("SCSI"), a serial attached SCSI ("SAS") interface, a serial advanced technology attachment ("SATA") interface, a fiber channel ("FC") interface, or other type of interface for physically connecting and transferring data between computers and physical storage units.

Generally, the computer-readable storage media 718 may store the components described herein as executable, computer-readable instructions. For instance, the components may include the API gateway 502, the metric determination component 112, or components associated with the metric determination component 112. The components may be stored and/or executed on a single server, or on a system of two or more computing devices 700.

The computing device 700 can store data on the mass storage device 720 by transforming the physical state of the physical storage units to reflect the information being stored. The specific transformation of physical state can depend on various factors, in different examples of this description. Examples of such factors can include, but are not limited to, the technology used to implement the physical storage units, whether the mass storage device 720 is characterized as primary or secondary storage, and the like.

For example, the computing device 700 can store information to the mass storage device 720 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 700 can further read information from the mass storage device 720 by detecting the physical states or characteristics of one or more particular locations within the physical storage units.

In addition to the mass storage device 720 described above, the computing device 700 can have access to the computer-readable storage media 718 to store and retrieve information, such as program modules, event structures, or other data. It should be appreciated by those skilled in the art that computer-readable storage media is any available media that provides for the non-transitory storage of data and that can be accessed by the computing device 700. In some examples, the operations performed by the service provider network 102, and or any components included therein, may be supported by one or more devices similar to computing device 700. Stated otherwise, some or all of the operations performed by the service provider network 102, and or any components included therein, may be performed by one or more computer devices 700 operating in a cloud-based arrangement. As shown, the mass storage device 720 may store the database 508 that includes information about meeting data, sensor data, user profiles, and services as well as rules and access policies.

By way of example, and not limitation, computer-readable storage media 718 can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disc ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 720 can store an operating system 722 utilized to control the operation of the computing device 700. According to one example, the operating system comprises the LINUX operating system. According to another example, the operating system comprises the WINDOWS® SERVER operating system from MICROSOFT Corporation of Redmond, Washington. According to further examples, the operating system can comprise the UNIX operating system or one of its variants. It should be appreciated that other operating systems can also be utilized. The mass storage device 720 can store other system or application programs and data utilized by the computing device 700.

In one example, the mass storage device 720 or other computer-readable storage media 718 is encoded with computer-executable instructions which, when loaded into the computing device 700, transform the computer from a general-purpose computing system into a special-purpose computer capable of implementing the examples described herein. These computer-executable instructions transform the computing device 700 by specifying how the processor(s) 704 transition between states, as described above. According to one example, the computing device 700 has access to computer-readable storage media storing computer-executable instructions which, when executed by the computing device 700, perform the various processes described above with regard to FIGS. 1-7. The computing device 700 can also include computer-readable storage media having instructions stored thereupon for performing any of the other computer-implemented operations described herein.

The computing device 700 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, or other type of output device. It will be appreciated that the computing device 700 might not include all of the components shown in FIG. 7, can include other components that are not explicitly shown in FIG. 7, or might utilize an architecture completely different than that shown in FIG. 7.

In various examples, the service provider network may be part of or associated with a cloud-based service network that can be configured to implement aspects of the functionality described herein.

The service provider network 102 can provide computing resources, like physical servers, VM instances, containers, serverless functions, network functions, and storage, on a permanent or an as-needed basis. Among other types of functionality, the computing resources provided by the service provider network 102 may be utilized to implement the various services described above. The computing resources provided by the service provider network 102 can include various types of computing resources, such as data processing resources like VM instances, data storage resources, networking resources, data communication resources, application-container/hosting services, network services, and the like.

Each type of computing resource provided by the service provider network 102 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The service provider network 102 can also be configured to provide other types of computing resources not mentioned specifically herein.

The computing resources provided by the service provider network 102 may be enabled in one embodiment by one or more data centers 504 (which might be referred to herein singularly as "a data center 504" or in the plural as "the data centers 504"). The data centers 504 are facilities utilized to house and operate computer systems and associated components. The data centers 504 typically include redundant and backup power, communications, cooling, and security systems. The data centers 504 can also be located in geographically disparate locations.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes examples having specific structural features and/or methodological acts, it is to be understood that the claims are not necessarily limited to the specific features or acts described. Rather, the specific features and acts are merely illustrative some examples that fall within the scope of the claims of the application.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some examples, one or more operations of the method may be omitted entirely. Moreover, the methods described herein can be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

What is claimed is:

1. A system comprising:
   one or more processors; and
   one or more non-transitory computer-readable media storing instructions executable by the one or more processors, wherein the instructions, when executed, cause the one or more processors to perform operations comprising:
      receiving first data representing a first set of metrics associated with an application program interface (API) over a first time period, the first data associated with a data stream that changes dynamically over the first time period;
      determining, based on the first data, a first probabilistic data structure identifying a first number of occurrences for each metric of the first set of metrics over the first time period;
      determining, based on the first probabilistic data structure, first hash values to represent the first set of metrics over the first time period;
      storing, as first stored data in a storage device, the first hash values and the first number of occurrences for each metric of the first set of metrics;
      receiving second data representing a second set of metrics associated with the API over a second time period that is subsequent to the first time period;
      determining, based on the second data, a second probabilistic data structure identifying a second number of occurrences of each metric in the second set of metrics over the second time period;
      determining, based on the second probabilistic data structure, second hash values to represent the second set of metrics over the second time period;
      storing, as second stored data, the second hash values in the storage device for processing at a later time;
      accessing, based on determining the second probabilistic data structure, the first stored data;
      determining a frequency of a first hash value of the first hash values over the first time period,
      determining, based on the first stored data, a subset of the first set of metrics, wherein determining the subset of the first set of metrics is based on the frequency of the first hash value; and
      configuring a message for sending to a computing device associated with a service implementing the API, the message including the subset of the first set of metrics.

2. The system of claim 1, the operations further comprising:
   accessing the first hash values or the second hash values from the storage device; and
   determining a third hash value based on the first hash values or the second hash values, the third hash value representing a baseline for determining a third set of metrics over a third time period after the second time period.

3. The system of claim 1, the operations further comprising:
   determining a frequency of one or more metrics between the first time period and the second time period,
   wherein determining the subset of the first set of metrics is based on the frequency of the one or more metrics.

4. The system of claim 1, the operations further comprising:
   determining that the first number of occurrences includes an occurrence for a metric that meet or exceed a threshold value; and
   selecting, as the subset of the first set of metrics, one or more metrics from the first set of metrics associated with a number of occurrences that meets or exceeds the threshold value.

5. A computer-implemented method comprising:
   receiving first data representing a first set of metrics associated with an internet protocol (IP) address over a first time period, the first data associated with a data stream that changes dynamically over a first time period;
   determining, based at least in part on the first data, a first probabilistic data structure associated with the first set of metrics over the first time period;
   receiving second data representing a second set of metrics associated with the IP address over a second time period that is subsequent to the first time period;
   determining, based at least in part on the second data, a second probabilistic data structure associated with the second set of metrics over the second time period;
   determining a first hash value of the first probabilistic data structure;
   determining a frequency of the first hash value over a plurality of time periods, wherein the plurality of time periods includes the first time period and the second time period;

determining, based on the frequency of the first hash, a first subset of metrics from the first set of metrics associated with the first probabilistic data structure;

configuring a message for sending to a computing device associated with the IP address, the message including the first subset of metrics; and storing, in a storage device, the second probabilistic data structure associated with the second set of metrics for determining a second subset of metrics at a later time.

6. The computer-implemented method of claim 5, and further comprising:

determining second hash value to represent the second probabilistic data structure; and merging the first hash value and the second hash value to generate a third hash value representing a combination of at least some of the first data and at least some of the second data, wherein determining the first subset of metrics is further based at least in part on the third hash value.

7. The computer-implemented method of claim 5, further comprising:

determining a rate at which the IP address accesses a new resource, wherein determining the first subset of metrics is further based at least in part on the rate.

8. The computer-implemented method of claim 5, further comprising:

determining frequency information associated with metrics in the first set of metrics; and selecting at least some metrics from the first set of metrics based at least in part on the frequency information, wherein determining the first subset of metrics is based at least in part on the selection of the at least some metrics.

9. The computer-implemented method of claim 5, further comprising:

determining a second hash value based at least in part on the first hash value, the second hash value representing a baseline for outputting over a third time period.

10. The computer-implemented method of claim 5, further comprising:

determining a frequency of one or more metrics between the first time period and the second time period, wherein determining the first subset of metrics is based at least in part on the frequency of the one or more metrics.

11. The computer-implemented method of claim 5, further comprising:

determining a first number of occurrences for each metric of the first set of metrics over the first time period; and selecting, as the first subset of metrics, one or more metrics from the first set of metrics based at least in part on the first number of occurrences.

12. The computer-implemented method of claim 5, further comprising:

applying a first probabilistic data structure algorithm to the first data to approximate a first number of occurrences for each metric of the first set of metrics over the first time period; and applying a second probabilistic data structure algorithm to the second data to approximate a second number of occurrences for each metric of the second set of metrics over the second time period, wherein determining the first probabilistic data structure and the second probabilistic data structure is based at least in part on the first probabilistic data structure algorithm or the second probabilistic data structure algorithm.

13. The computer-implemented method of claim 5, further comprising:

receiving one or more criteria from a model or a user of the computing device; and determining a threshold number of metrics to include as the first subset of metrics based at least in part on the one or more criteria.

14. The computer-implemented method of claim 5, further comprising:

receiving third data indicating available computational resources of the computing device; and determining a length of the first time period or the second time period based at least in part on the third data.

15. One or more non-transitory computer-readable media storing instructions that, when executed, cause one or more processors to perform operations comprising:

receiving first data representing a first set of metrics associated with an internet protocol (IP) address over a first time period, the first data associated with a data stream that changes dynamically over a first time period;

determining, based at least in part on the first data, a first probabilistic data structure associated with the first set of metrics over the first time period;

receiving second data representing a second set of metrics associated with the IP address over a second time period that is subsequent to the first time period;

determining, based at least in part on the second data, a second probabilistic data structure associated with the second set of metrics over the second time period;

determining a first hash value of the first probabilistic data structure;

determining a frequency of the first hash value over a plurality of time periods, wherein the plurality of time periods includes the first time period and the second time period;

determining, based on the frequency of the first hash, a first subset of metrics from the first set of metrics associated with the first probabilistic data structure;

configuring a message for sending to a computing device associated with the IP address, the message including the first subset of metrics; and storing, in a storage device, the second probabilistic data structure associated with the second set of metrics for determining a second subset of metrics at a later time.

16. The one or more non-transitory computer-readable media of claim 15, the operations further comprising:

determining a rate at which the IP address accesses a new resource, wherein determining the first subset of metrics is further based at least in part on the rate.

17. The one or more non-transitory computer-readable media of claim 15, the operations further comprising:

determining a second hash value based at least in part on the first hash value values, the second hash value representing a baseline for outputting over a third time period.

* * * * *